United States Patent Office 3,705,137
Patented Dec. 5, 1972

3,705,137
PRECIPITATION COPOLYMERIZATION OF METAL SALTS OF UNSATURATED CARBOXYLIC ACIDS
Kenshi Kuwahara, Shigetada Sonoda, and Masahito Ishii, Tokyo, Japan, assignors to Mitsui Mining & Smelting Co., Ltd., Tokyo, Japan
No Drawing. Continuation-in-part of application Ser. No. 612,808, Jan. 31, 1967. This application Dec. 4, 1969, Ser. No. 882,280
Int. Cl. C08f 1/11
U.S. Cl. 260—80.3 E    5 Claims

ABSTRACT OF THE DISCLOSURE

A method of preparing copolymers of metal salts of unsaturated carboxylic acids suitable for use as a stabilizer for chlorine-containing resins, such as polyvinyl chloride, by means of precipitation copolymerization in an alcohol solution containing water. A stabilizer composition comprising a mixture of said copolymers of metal salts of unsaturated carboxylic acids and chlorine-containing resin.

This application is a continuation-in-part of our co-pending applcation Ser. No. 612,808, now abandoned.

BACKGROUND OF THE INVENTION

Field of the invention

This invention relates to a method of preparing polyvalent copolymers of two or more monomers consisting of (1) at least one metal salt of an unsaturated acid selected from the group consisting of the zinc, lead, cadmium, aluminum and alkaline earth metal salts of acrylic acid, methacrylic acid and crotonic acid and (2) at least one polymerizable vinyl monomer selected from the group consisting of acrylic esters, methacrylic esters, vinyl ethers, styrene, acrylonitrile, vinyl chloride and vinylidene chloride, and also relates to a composition obtained by adding the foregoing copolymer to a chlorine-containing resin for stabilization purposes.

Description of the prior art

In the synthetic resin industry, it has hitherto been common to mix stabilizers with resin materials which are to be made into film and other processed goods. The addition of the stabilizer to the resin reduces or prevents the deterioration of the resin composition due to exposure to heat and/or light during and after its processing. The resin composition thereafter is made into molded goods suitable for various purposes.

The stabilizers in general used for making such stabilized resin compositions include the metal salts of higher fatty acids such as stearic acid, metal salts of organic acids such as naphthenic acid, octyl acid, acetacetyl acid, etc., and organic tin compounds. However, combinations of two or three or more of these stabilizers are usually employed and even the combined use of many stabilizers in the prior art has not always sufficed to provide an adequate stabilization property.

Especially, when a vinyl chloride resin composition is to be used for packaging food, the stabilizer employed therewith must be nontoxic and, accordingly, it has been customary to employ stabilizers approved by the FDA, such as calcium-zinc mixed soap, epoxidized soybean oil and octyl tin compound. However, the former two stabilizers have poor thermal stability while the latter stabilizer can be used in only limited amounts. Thus, it has not been possible to provide a vinyl chloride resin composition having the desired thermal stability.

SUMMARY OF THE INVENTION

The stabilizer to be employed with chlorine-containing resins according to the present invention is a powder form copolymer which is superior to conventional stabilizers in efficiency. The stabilizer consists essentially of a copolymer of:

(1) At least one metal salt selected from the group consisting of the zinc, lead, cadmium, calcium, magnesium, barium and aluminum salts of an acid selected from the group consisting of acrylic acid, methacrylic acid and crotonic acid; and (2) At least one polymerizable vinyl monomer selected from the group consisting of alkyl acrylate esters whose alkyl group has 1 to 18 carbon atoms, alkyl methacrylate esters whose alkyl group has 1 to 18 carbon atoms, styrene, acrylonitrile, alkyl vinyl ethers whose alkyl groups has 1 to 18 carbon atoms, vinyl chloride and vinylidene chloride.

The copolymer according to the present invention is adapted for use as a stabilizer for chlorine-containing resins and it possesses numerous advantageous characteristics, including:

(a) Molded products made of a chlorine-containing resin and said copolymer are colorless and transparent except when a lead-containing copolymer is used;

(b) The copolymers containing the calcium, magnesium, aluminum or zinc salts of unsaturated carboxylic acids result in less metal effluence as compared with metallic soaps of the same metals as used in the prior art and, accordingly, the stabilizers according to the present invention are less toxic;

(c) When compared in terms of the same metals, the copolymer stabilizer according to the present invention provides greatly superior thermal stability and weatherproof property (light resistance) as compared to the metallic soaps or metal salts of the prior art;

(d) The copolymer stabilizer has an excellent mutual solubility with chlorine-containing resins; and (e) It prevents plate-out during the processing of a chlorine-containing resin composition.

Now, the method of preparing the copolymers for use as the stabilizer according to the present invention will be described in the following.

To begin with, inasmuch as the present copolymers are intended for use as a stabilizer for chlorine-containing resins, the copolymers to be formed should be easily soluble in or uniformly dispersible into chlorine-containing resins. In addition, in order to meet such requirements as satisfactory thermal stability as referred to in the foregoing (c) and processing efficiency as referred to in the foregoing (e), they should not contain any substantial amount of unreacted monomers.

The method according to the present invention provides a procedure for preparing the copolymers in the form of an extra fine powder (with a mean grain size of about 0.05–6μ) suitable for use as a stabilizer. The method is characterized by the steps of: causing at least one member selected from the group consisting of the zinc, lead, cadmium, aluminum and alkaline earth metal salts of an acid selected from the group consisting of acrylic acid, methacrylic acid and crotonic acid and at least one member selected from the group consisting of acrylic esters, methacrylic esters, alkyl vinyl ethers, styrene, vinyl esters, acrylonitrile, vinyl chloride and vinylidene chloride to mutually dissolve in an aqueous solution containing at least one member selected from the group consisting of methyl alcohol, ethyl alcohol, propyl alcohols and isobutyl alcohol and mixtures thereof; and causing the resultant solution to be copolymerized in the presence of a radical polymerization initiator, such as a peroxide like benzoyl peroxide, an azo compound like azobisisobutyronitrile, or potassium persulfate and sodium hydrogen sulfite.

The compounding (weight) ratio of the salts of unsaturated carboxylic acids, the first essential component, and the vinyl monomers, the second essential component, is a very important factor in producing an extra fine powder capable of serving the foregoing purposes. When the weight ratio of the metal salt of unsaturated carboxylic acid to the total weight of monomers included in the reaction system is excessively small, the resultant copolymer takes the form of a clot (a mass of more than several mm. in size) or the form of a sticky gel, and it is difficult to obtain the desired end product in the form of extra fine powder. If the reaction product takes the form of a clot, it becomes very difficult to remove completely the solvent and the unreacted monomer therefrom. As a result, when a clot-form copolymer is employed as a stabilizer, its stabilizing effect on the resin composition is remarkably reduced due to even a very small amount of unreacted monomer remaining therein, and, not only that, it must be pulverized because of its clot from and, even if it is somehow pulverized, its dispersibility and mutual solubility in the resin is unsatisfactory.

On the other hand, when the weight ratio of the salts of unsaturated carboxylic acids to the total weight monomers included in the reaction system is extremely large, the efficiency of the resultant copolymer is reduced so that it becomes similar to that of a polymer of the salts of unsaturated carboxylic acids alone. As a result, when it is employed as a stabilizer, its thermal stability effect and mutual solubility with the chlorine-containing resin is reduced.

In view of the foregoing, the weight ratio of the salts of unsaturated carboxylic acids contained in the reaction system is between about 8.0 percent by equivalent and about 75 percent by equivalent based on the total weight of the monomers in said reaction system.

The water content of the aqueous alcohol solution to be employed as the reaction solvent also constitutes a very important factor. When the water content of the aqueous alcohol solution is large, not only is the solubility of the vinyl monomer, the second essential component, reduced so that the solution becomes divided into two phases, but also the resultant copolymer takes the form of a clot, not the form of a powder. On the other hand, when the water content is excessively small, the solubility of the salts of unsaturated carboxylic acids decreases. Therefore, the water concentration in the aqueous alcohol solution for use as a solvent in the reaction system must be between about 5 weight percent and about 50 weight percent.

The polymerizing method according to the present invention is a precipitation copolymerization. To be more precise, the aforesaid monomers are mutually dissolved in a reaction solvent consisting of an aqueous alcohol solution, and then a polymerization initiator is added to the thus obtained solution, thereby giving rise to the formation of a copolymer of an unsaturated carboxylic acid salt-vinyl monomer, which copolymer is insoluble in said solvent. Either an open type receptacle equipped with a reflux condenser or a pressure autoclave can be used as the reaction vessel. Alternatively, continuous polymerization can be effected by passing the foregoing mixture through a heated pipe. Agitation of the mixture is not always required, but it is preferable for the sake of obtaining a uniform copolymer.

In the present invention, the polymerization conditions constitute a very important factor for obtaining a uniform powder having a grain size of less than several microns.

The rate of polymerization of metal salts of unsaturated carboxylic acids (strictly speaking, the monomer reactive ratio of salts of unsaturated carboxylic acids) is extremely high as compared with that of vinyl monomers, the second component. (In general, the monomer reactive ratio $r_1$ for metal salts of unsaturated carboxylic acids is in the range of 5–20, while the monomer reactive ratio $r_2$ for vinyl monomers is in the range of 0.0–0.5.) Therefore, according to the batch method of polymerization, the composition ratio of unreacted monomers in the reaction system changes with the progress of the polymerization reaction. In other words, as the polymerization reaction progresses, the weight ratio of salts of unsaturated carboxylic acids within the monomers in the reaction system decreases until it becomes less than 8.0 percent by equivalent. If the polymerization reaction is allowed to continue in this condition, there will be formed a clot-form copolymer in the later stages of the polymerization reaction and, consequently, the thus formed clot-form copolymer product will be mixed into the previously formed powder-form copolymer. Such a copolymer mixture has a reduced efficiency as a stabilizer, so that it is necessary either to discontinue the polymerization reaction before the aforesaid content ratio of the metal salts of unsaturated carboxylic acids becomes about 8.0 percent by equivalent or to add extra metal salt monomers of unsaturated carboxylic acids from time to time as needed to assure that the content is never less than 8.0 percent by equivalent within the reaction system. However, there is an exception to this general rule, namely, when there is used a higher alkyl vinyl ether (whose alkyl group contains 8–18 carbon atoms) as the vinyl monomer constituting the second component of the copolymer. When a higher alkyl vinyl ether is used, even when said ratio falls below the foregoing value, to wit, the amount of the salts of unsaturated carboxylic acids becomes less than 8 percent by equivalent, an extra fine powder-form copolymer can be formed and, when almost all of the salts of carboxylic acids are polymerized, the polymerization reaction in the reaction system ceases naturally.

In the batch method of polymerization, the maximum polymer yield, when the copolymer is to be obtained in the form of powder, is very closely related with the composition of the monomers introduced, the reaction temperature, the amount of polymerization initiator used and the length of the polymerization period. For instance, once the composition of monomers introduced, the reaction temperature and the polymerization initiator are determined, the polymerization period for realizing a maximum polymer yield of necessity becomes fixed. However, the polymerization period depends on a number of variables so that it cannot be described precisely.

The copolymer obtained under the foregoing conditions can be easily and completely separated from unreacted monomers by filtering it and washing it with an aqueous alcohol solution.

Further, by subjecting the thus separated copolymer to vacuum drying, there is obtained an extra fine powder of low apparent specific gravity.

Next, there will be given a detailed explanation of the stabilized compositions consisting of a chlorine-containing resin with a copolymer stabilizer prepared as described above.

The term "chlorine-containing polymer" as referred to in the present description shall refer to the polymers enumerated below:

(a) Polyvinyl chloride (a straight polymer)

(b) Polyvinylidene chloride (a straight polymer)

(c) Copolymer comprising vinyl chloride and/or vinylidene chloride, and at least one additional monomer selected from the group consisting of vinylidene chloride, ethylene, propylene, isobutylene, acrylonitrile, alkyl vinyl ether (whose alkyl group contains 1–18 carbon atoms), vinyl alkyl ester (whose alkyl group contains 1–18 carbon atoms), acrylic ester (wherein the alkyl group of the ester contains 1–18 carbon atoms), methacrylic ester (wherein the alkyl group of the ester contains 1 to 18 carbon atoms), styrene, maleic anhydride, maleic ester (wherein the alkyl group of the ester contains 1 to 18 carbon atoms) and vinyl chloride.

(d) A blended mixture consisting of (1) at least one member of the group consisting of polymers of the foregoing types (a) through (c) and (2) at least one member selected from the group consisting of styrene-butadiene copolymers, acrylonitrile-butadiene copolymers, acrylonitrile-styrene copolymers, acrylonitrile-butadiene-styrene copolymers, methylmethacrylate-butadiene-styrene copolymers and ethylene-vinyl acetate copolymers admixed with the former (1).

According to the present invention, (A) from about 0.05 to about 20 parts by weight of one or more members of the group of stabilizer copolymers comprised of unsaturated carboxylic acid salt-vinyl monomer is added to (B) each 100 parts by weight of at least one member of the group of chlorine-containing polymers as defined in the foregoing (a) through (d). When the stabilized composition comprises less than 0.05 part by weight of a stabilizer per 100 parts of the chlorine-containing polymer, the stabilizing effect of said stabilizer is insufficient and a satisfactory stabilization of the chlorine-containing polymer cannot be obtained. On the other hand, when the stabilizer copolymer is used in an amount in excess of 20 parts by weight per 100 parts of chlorine-containing polymer, there does not always result an increase in the stabilizing effect in proportion to the increase in the amount of the stabilizer, but rather the processing property of the composition is deteriorated due to the high melting point of the stabilizer, per se. Moreover, the use of such large amounts of the stabilizer is undesirable also from the economic point of view.

The efficiency of the copolymer stabilizer pursuant to the present invention may be further enhanced by its combined use with various additional compounds as follows.

(a) Conventional stabilizers

Metallic soaps—zinc, cadmium, lead, aluminum, tin and alkaline earth metal salts of higher fatty acids (such as lauric acid, stearic acid, oleic acid, ricinoleic acid, sebacic acid and their mixed fatty acids).
Organic acid salts—lead, zinc, cadmium, aluminum, tin and alkaline earth metal salts of organic acids such as nonyl phenol, ethyl acetoacetate, diethylcaproic acid and 2-ethylhexylic acid.
Organic tin compounds—dibutyl tin dilaurate, dibutyl tin maleate, dioctyl tin dilaurate, dibutyl tin mercaptide and polymer-type organic tin compound.

These conventional stabilizers may be added at the rate of from about 0.01 to about 15 parts by weight per 100 parts by weight of the chlorine-containing polymer.

(b) Lubricants for providing the chlorine-containing polymer composition with lubricity higher fatty acids and metal salts thereof
higher aliphatic alcohols
higher aliphatic amides
comparatively macromolecular organic polymers such as AC
polyethylene These lubricants may be added up to about 15 parts by weight per 100 parts by weight of the chlorine-containing polymer.

(c) Plasticizers phthalic esters such as dioctyl phthalate (DOP)
fatty acid esters such as stearic ester
straight-chain dibasic acid esters such as dioctyl adipate
epoxy compounds such as epoxidized soybean oil
phosphate compounds such as tricresyl phosphate
chlorinated olefin, chlorinated paraffin, or chlorinated rubber These plasticizers may be employed by combining one or more of them with the chlorine-containing polymer at the rate of from about 2 to about 100 parts by weight of the former per 100 parts by weight of the latter.

(d) Other additives

Epoxy compounds—may be added at the rate of 0.1–20 parts by weight per 100 parts by weight of the chlorine-containing polymer.
Chelating agent such as ester of organic phosphite compounds—may be added at the rate of 0.1–5 parts by weight per 100 parts by weight of the chlorine-containing polymer.
Antioxidant such as sulphur-containing organic compounds—may be added at the rate of 0.01–2 parts by weight per 100 parts by weight of the chlorine-containing polymer.
Ultraviolet ray absorbing agent—may be added at the rate of 0.01–2 parts by weight per 100 parts by weight of the chloride-containing polymer.

Further, chemical blowing agents, antistatic agents, pigments, dyes, extenders or fillers may also be employed in combination with the stabilizer of the present invention.

A preferred method for making metals of different kinds display their synergistic stabilizing effects most efficiently when they are used for the stabilization of chlorine-containing resins, using a stabilizer copolymer comprised of unsaturated carboxylate-vinyl monomer according to the present invention, is to combine at least two metal salts of unsaturated acids deemed to have synergistic stabilizing effect at the time of the polymerization of said copolymer, and to make said metal salts copolymerize with the vinyl monomer. According to this method, there exists—within one and the same molecule of the obtained copolymeric stabilizer—metals capable of displaying synergistic stabilizing effect and, by virtue of such metals the resultant synergistic stabilizing effect is far superior to that of a stabilizer according to the coprecipitation method. The copolymers capable of displaying such a synergistic stabilizing effect, as above described, include, for instance:

Zn acrylate-Ca acrylate-laurylvinylether copolymer,
Zn acrylate-Cd acrylate-acrylonitrile copolymer,
Cd acrylate-Ba acrylate-methylmethacrylate copolymer,
Cd-Ba-Zn acrylate-acetylvinylether copolymer,
Zn-Ba acrylate-laurylvinylether copolymer, and
Cd-Ba-Pb acrylate-laurylvinylether copolymer.

Although the foregoing examples refer only to acrylates, the same advantageous results are achieved with copolymers employing methacrylates or crotonates, instead of acrylates.

As for the other well-known conventional additives referred to above, they will bring about the same advantageous effects as they do in the prior art procedures, when they are combined with the copolymer stabilizer according to the present invention and added to the chlorine-containing resin.

Next, it is to be noted that one of the characteristics of the composition according to the present invention is its excellent transparency. That is, the transparency of the chlorine-containing resin per se is scarcely diminished by mixing in the stabilizer copolymer according to the present invention. Especially, the copolymer stabilizers, except those copolymer stabilizers which contain the lead salt, are excellent because they do not substantially reduce the transparency of chlorine-containing resin; nevertheless, even the copolymer of the lead salt according to the present invention is far superior to, for instance, lead stearate of the prior art as regards their effect on transparency.

The following Table 1 lists the comparative values of the transparency of sheets obtained from compositions prepared by adding conventional stabilizers to polyvinyl chloride and the transparency of sheets obtained from compositions prepared by employing the copolymer stabilizers according to the present invention.

Each composition comprised 100 parts by weight of polyvinyl chloride, 2 parts by weight of the stabilizer and 0.5 parts by weight of stearic acid. The composition was molded into the form of a sheet (of 1.6 mm. thickness) by roll processing at 160° C. for 10 minutes. The transparency of the resultant sheet was determined by measuring the light transmittancy by means of an HEZE Tester.

TABLE 1

| Stabilizer contained in compositon: | Percent transmittancy |
|---|---|
| None | ---- |
| Zinc stearate | 80.8 |
| Zinc 2-ethyl-hexoate | 82.8 |
| Dibutyl tin dilaurate | 93.9 |
| Cadmium stearate | 81.5 |
| Cd-Ba complex stabilizer | 80.9 |
| Dibutyl tin maleate | 94.9 |
| Zinc acrylate-acrylonitrile copolymer | 93.8 |
| Zinc acrylate-laurylvinyl ether copolymer | 93.9 |
| Zinc acrylate-methylmethacrylate copolymer | 92.9 |
| Zinc acrylate-styrene copolymer | 76.3 |

The values compared in Table 1 are those which were obtained when 2 parts by weight of the stabilizer was contained in the respective compositions as above described. With regard to the conventional stabilizers comprising metallic soaps, if the amount thereof used exceeds 2 parts by weight, the value of the transparency becomes less than half that shown in the foregoing Table 1. With regard to the stabilizers according to the present invention, on the other hand, even if the amount thereof used is increased to about 5 parts by weight, the reduction of transparency is trifling. In light of the foregoing, it is understood that the copolymer stabilizer according to the present invention is possessed of an efficiency at least substantially equal to that of the organic tin compounds which have heretofore been rated as the best stabilizers from the view point of harmlessness with respect to the transparency of the polymer.

Further, the stabilizer copolymers of the present invention containing any one of the unsaturated carboxylates of calcium, magnesium, aluminum and zinc are most suitable as a nontoxic stabilizer of chlorine-containing resin for use as food packaging or water supply pipe materials. These chlorine-containing resin compositions comprising the unsaturated carboxylate copolymers not only display an excellent thermal stabilizing effect as compared with conventional compositions employing calcium, aluminum or zinc soaps, but also the effluence of metals from the stabilizer copolymer is extremely small in amount. For example, when a PVC sheet composition produced by employing a conventional zinc stearate stabilizer and a PVC sheet composition produced by employing a zinc acrylate-laurylvinyl ether copolymer stabilizer, according to the present invention, were dipped in pure water, 5 percent $Na_2CO_3$ solution, 5 percent citric acid solution and 50 percent ethyl alcohol solution, respectively, at a temperature of 80° C. for 10 days, and then the amount of metals which flowed out into or become present in the respective solutions was calculated, the amount of said metal effluent in case of the copolymer stabilizers according to the present invention proved to be only $1/10$–$1/400$ of that when zinc stearate was used.

Further details of the invention will become apparent from a consideration of the following preferred embodiments, which are given for purposes of illustration only.

DESCRIPTION OF THE PREFERRED EMBODIMENTS

Example 1

In a 2 liter resin flask equipped with a reflux condenser and an agitator was introduced 1 liter of a 50 percent aqueous solution of ethyl alcohol. Then 210 gr. (2.1 equivalent) of methylmethacrylate and 90 gr. (0.87 equivalent) of zinc acrylate were mutually dissolved therein. The thus prepared solution was heated on a water bath and, while being agitated vigorously, 2 gr. of benzoyl peroxide was added thereto. Copolymerization was effected at 75° C., the boiling point of the reaction system. Three hours later, the reaction was discontinued. The contents were immediately filtered out and were subjected to washing with an aqueous alcohol solution several times. After drying with a vacuum drier at 80° C. for 8 hours, a copolymer containing no unreacted monomers was obtained in the form of an extra fine, white powder. The polymer yield was 25 percent, the zinc content in the copolymer was 20.0 percent, and the ratio of zinc acrylate among the unreacted monomers within the reaction solvent was 12.0 percent by equivalent. When the polymerization was carried out for more than 5 hours by employing a solution of the same composition as referred to above, the resultant copolymer contained clot-form products. Five parts by weight of the powder-form copolymer, free from clot-form products were added to 100 parts by weight of polyvinyl chloride, and there was further added thereto 50 parts by weight of a plasticizer and 0.5 part by weight of a lubricant. The mixture was subjected to molding at 160° C., whereby there were obtained colorless, transparent molded goods of excellent thermal stability and weatherproof property. When this product was compared with the molded goods produced by employing other thermal stabilizers such as zinc stearate, silica gel coprecipitation silicate, calcium stearate, lead stearate and dibutyl tin dilaurate and the molded goods produced by employing unreacted monomers, the results were as shown in the following Table 2.

TABLE 2

| Stabilizer employed | Time required for Congo Red discoloration, minutes | Weatherproof property | Transparency | Toxicity |
|---|---|---|---|---|
| Zinc stearate | 5 | Fairly good | Opaque | Nontoxic. |
| Calcium stearate | 30 | ---do--- | ---do--- | Do. |
| Silica gel coprecipitation silicate | 40 | Good | Transparent | Toxic. |
| Dibutyl tin dilaurate | 80 | Excellent | ---do--- | Do. |
| Lead stearate | 135 | Best | Opaque | Do. |
| Zinc acrylatemethylmethacrylate copolymer according to the present invention. | 60 | ---do--- | Transparent | Nontoxic. |
| Zinc acrylate monomer | 5 | Fairly good | ---do--- | Do. |
| Zinc acrylatemethylmethacrylate copolymer, containing unreacted zinc acrylate. | 5 | ---do--- | ---do--- | Do. |

Example 2

By employing an apparatus similar to that for Example 1, 155.4 gr. (1.5 equivalent) of zinc acrylate and 159 gr. (3 equivalent) of acrylonitrile were made to mutually dissolve in 1.5 liters of 70 percent methyl alcohol. The resultant solution was heated on a water bath up to about 65° C., the boiling point of the reaction system, and, while agitated vigorously, 8 gr. of polymerization initiator (benzoyl peroxide) was added thereto, thereby immediately initiating the polymerization reaction. The speed of the reaction changed in such a way that at the beginning it was rapid, next it slowed down gradually and, 5 hours later, the rate of increase in polymerization became extremely small. After an elapsed time of 5 hours, the polymerization reaction was discontinued and the contents of the apparatus were filtered out, washed with an aqueous alcohol solution and dried, whereby there was obtained a copolymer in the form of ultra fine, citrine powder (of about 1 µ in size) and containing no unreacted monomers. The polymer yield was 82.0 percent and the zinc content in the copolymer was 17.9 percent. The ratio of zinc acrylate among the unreacted monomers within the reaction solvent was 9.4 percent by equivalent.

The foregoing powder-form copolymer, when employed as a component of the stabilizer for vinyl chloride resin (PVC), displayed a superb thermal stability and produced a colorless, transparent composition.

Despite the fact that the zinc acrylate-acrylonitrile copolymer is one containing zinc, it did not give rise to zinc burning even in case of an oven test at 170° C. for 100 minutes.

The following formulations (A), (B) and (C) are examples of compositions stabilized by mixing stabilizers consisting of zinc acrylate-acrylonitrile copolymer into PVC.

| Examples of compositions: | Parts by weight |
|---|---|
| (A) PVC (Geon 103 Ep) | 100 |
| DOP | 37 |
| Epoxy compounds | 3 |
| Zinc acrylate-acrylonitrile copolymer | 2 |
| Stearic acid (H-st) | 0.5 |
| (B) PVC (Geon 103 Ep) | 100 |
| DOP | 37 |
| Epoxy compounds | 3 |
| Phosphorous chelator | 0.2 |
| Zinc acrylate-acrylonitrile copolymer | 1.2 |
| Calcium stearate | 0.8 |
| H-st | 0.2 |
| (C) PVC (Geon 103 Ep) | 100 |
| DOP | 37 |
| Epoxy compounds | 3 |
| Zinc acrylate-acrylonitrile copolymer | 0.2 |
| Cadmium stearate | 0.8 |
| Barium stearate | 1.0 |
| H-st | 0.5 |

The copolymer stabilizer according to the present invention has an excellent synergistic stabilizing effect and, when employed as a partial substitute for cadmium stearate, is capable of providing more excellent stability and transparency than that obtained when cadmium stearate alone is employed.

Example 3

By employing an apparatus similar to that for Example 1, 600 gr. of an aqueous solution containing 80 gr. (1 equivalent) of aluminum acrylate and 100 gr. (1 equivalent) of ethyl acrylate were dissolved in 800 gr. of methyl alcohol. The water concentration in the solvent (water plus alcohol) was 39.4 percent by weight. The thus prepared solution was heated on a water bath up to near the boiling point (65° C.) of the reaction system and, by adding thereto 0.5 gr. of ammonium persulfate, 1 ml. of hydrogen peroxide solution (35 percent) and 0.5 gr. of sodium hydrogen sulfite, polymerization was initiated.

Three hours later, polymerization was discontinued, and the product was filtered out, washed with an aqueous solution of alcohol and was dried, whereby there was obtained a copolymer in the form of a white powder free from any unreacted aluminum acrylate. The polymer yield was 55 percent, and the aluminum content in the copolymer was 6.9 percent. The ratio of unreacted aluminum acrylate within the reaction solvent is 29 percent by equivalent.

The foregoing powder-form copolymer, when employed as a stabilizer for vinyl chloride resin, is capable of providing a composition of a superior thermal stability which could not be expected from any conventional aluminum stearate and the like. As for the aluminum acrylate-ethyl acrylate copolymer, it has the property that, when it is employed alone, it colors the PVC products during the early stage of their processing like calcium or barium soaps, although to a lesser extent. Therefore, it is more effective to employ it in combination with a zinc-containing copolymer or soaps of zinc stearate, cadmium stearate, etc. as shown in Example 2.

| Example of compositions: | Parts by weight |
|---|---|
| Vinyl chloride-ethylene copolymer | 100 |
| Dioctyl phthalate | 37 |
| Epoxy compounds | 3 |
| Aluminum acrylate-ethyl acrylate copolymer | 1.0 |
| Zinc acrylate-acrylonitrile copolymer | 1.0 |
| AC polyethylene | 0.1 |

The foregoing composition was subjected to roll kneading under a temperature of 170° C. and for 10 minutes, thereby producing a sheet. Subsequently, the PVC sheet was exposed in an oven at 170° C. and, even after the lapse of 100 minutes, it remained transparent except it was just slightly tinged with yellow.

Example 4

By employing an apparatus similar to that for Example 1, 189 gr. (1 equivalent) of lead methacrylate and 104 gr. of (1 equivalent) of styrene were dissolved in ACL (i.e. aqueous solution of mixed alcohol consisting of 70 weight percent of ethyl alcohol, 20 weight percent of methyl alcohol and 10 weight percent of water). The thus prepared solution was heated to about 74° C. on a water bath and, while agitated vigorously, 4 gr. of benzoyl peroxide was added thereto, thereby initiating the polymerization reaction. The yield of copolymer was 50.5 percent after 1 hour, 58.2 percent after 2 hours, 62.0 percent after 3 hours and 64.2 percent after 5 hours, respectively, and the increase of yield subsequent thereto became insignificant. Continuation of the polymerization reaction beyond 5 hours resulted in the formation of clot-form products and mixing thereof in the powder-form copolymer, so that best results were obtained when said polymerization reaction was discontinued in less than 5 hours. At the end of 5 hours reaction, the ratio of lead acrylate among the unreacted monomers in the reaction solvent is 8.6 percent by equivalent.

When the effect of employing the present lead methacrylate-styrene copolymer as the thermal stabilizer for PVC was compared with that obtained by employing a conventional stabilizer consisting of lead stearate, it was observed that a sheet consisting of PVC composition employing lead stearate showed a rapid deterioration when subjected to 80 minutes exposure in an oven at 175° C., while the counterpart thereof employing a copolymer containing lead methacrylate scarcely showed deterioration even when subjected to 100 minutes exposure in the same test.

With respect to the amount of lead flowing out from a sheet consisting of the foregoing composition, according to the present invention, when an object molded therefrom is placed in water or an aqueous solution of alcohol, weak alkali and weak acid, the "flow-out" was very much smaller in the case of a sheet employing said copolymer as compared with a sheet employing lead stearate as the stabilizer. Accordingly, it may be safely said that the former is less toxic than the latter. Besides, there was observed a conspicuous improvement of the weatherproof property of the product using the stabilizer according to the present invention.

Example 5

By employing an apparatus similar to that for Example 1, monomers of laurylvinyl ether (LVE), calcium acrylate and zinc acrylate were mutually dissolved in isopropyl alcohol (IPA) containing 10 percent water, and the thus prepared solution was subjected to polymerization at about 80° C. until the polymerization reaction practically came to a halt (i.e. for about 6 hours).

The resultant suspension was immediately filtered, washed with hot alcohol and dried, whereby there was obtained a copolymer in the form of a white, ultra fine powder.

The compositions of monomers employed, the polymer yields and the compositions of copolymer obtained are respectively shown in the following Table 3.

Examples wherein the foregoing copolymers are employed as a stabilizer for chlorine-containing resin will be described later in Example 11.

parts by weight each of zinc stearate and cadmium stearate, in lieu of the foregoing copolymer, and in the same way as in the foregoing, two sheets of 0.7 mm. in thickness were prepared. The results of deterioration tests conducted on the above three kinds of sheets by means of the gear oven method and a weather-o-meter (in this case, WE–II model machine manufactured by Toyo Rika K.K. was employed) are as shown in Table 4. The figures in said table represent respectively the time from the start of the test until the sheet assumes a blackish-brown color.

TABLE 4

| Stabilizer employed | Condition of sheet after rolling | Gear oven test at 170° C. (in case 0.5 parts by weight of Ca stearate is additionally employed), (minutes) | Weather-O-meter test 45° C. (hour) |
|---|---|---|---|
| Copolymer | Colorless; transparent. | 100 (150) | 500 |
| Zinc stearate | Colorless; semi-transparent. | 10 (20) | 100 |
| Cadmium stearate. | Colorless; slightly cloudy. | 120 (160) | 600 |

TABLE 3

| Lauryl-vinyl ether-zinc acrylate-calcium acrylate-copolymer | Composition of monomers employed, gr. | | | | Percent composition of polymer obtained | | | |
|---|---|---|---|---|---|---|---|---|
| | Lauryl-vinyl ether | Zinc acrylate | Calcium acrylate | Volume reaction solvent, ml. | Percent ploymer yield | Zinc acrylate | Calcium acrylate | Lauryl-vinyl ether |
| LVE-Zn-Ca #5020 | 45 | 75 | 30 | IPA 1200 | 90.0 | 56.63 | 21.29 | 22.10 |
| LVE-Zn-Ca #3535 | 45 | 52.5 | 52.5 | do | 88.7 | 39.67 | 37.40 | 22.9 |
| LVE-Zn-Ca #2050 | 45 | 30 | 75 | do | 88.0 | 23.46 | 54.96 | 21.6 |
| LVE-Zn-Ca #4020 | 60 | 60 | 30 | do | 77.1 | 52.67 | 24.84 | 22.5 |
| LVE-Zn-Ca #3030 | 60 | 45 | 45 | do | 77.6 | 39.44 | 36.76 | 23.8 |
| LVE-Zn-Ca #2040 | 60 | 30 | 60 | do | 75.8 | 27.33 | 49.41 | 23.3 |

Example 6

Into an iron autoclave provided with glass lining, containing 2 liters of 95 percent benzene denatured industrial alcohol solution (which contains about 5 percent water) were placed 30 parts by weight of cadmium crotonate and 20 parts by weight of barium acrylate. After adding 4 gr. of benzoyl peroxide to the solution, the autoclave was closed. Then, 50 parts by weight of liquefied vinyl chloride monomer was poured into the autoclave, the temperature was raised to 70° C., and the solution was polymerized while being agitated vigorously. After 8 hours, the autoclave was opened and there was obtained a copolymer in the state of a white suspension. The suspended copolymer was filtered, washed with aqueous alcohol solution and dried, and there was recovered a white, extra fine powder.

In this case, the polymer yield was 32 percent, the cadmium content of the copolymer was 36 percent and the barium content in the same was 12 percent.

This copolymer, when employed as a stabilizer for a chlorine-containing resin, was capable of producing molded goods of excellent transparency and thermal resistance.

Example of composition:                      Parts by weight
  Vinyl chloride-vinylidene chloride copolymer __ 100
  Zinc crotonate-barium acrylate-vinyl chloride
    copolymer _____ 4
  L–500 (lubricant) _____ 15

Example 7

Into a mixture comprising 100 parts by weight of vinyl chloride resin ($\overline{P}=1050$), 35 parts by weight of DOP. 3 parts by weight of epoxidized soybean oil and 0.5 part by weight of stearic acid; was added 2 parts by weight of a copolymer of zinc acrylate and laurylvinyl ether and the mixture was thoroughly blended. The thus blended mixture was then subjected to fusion kneading by two-roll machine heated to 160° C. for 5 minutes, thereby producing a sheet of 0.7 mm. in thickness. On the other hand, for the purpose of comparison, by employing 2

As seen in Table 4 above, the copolymer stabilizer according to the present invention is possessed of a conspicuously high stabilizing efficiency as compared with zinc stearate and is almost equal to cadmium stearate in said efficiency, while, as for transparency, it is superior to both stearates.

Example 8

Excepting that vinyl chloride wherein $\overline{P}=800$ is employed in lieu of vinyl chloride wherein $\overline{P}=1050$ as employed for Example 7, and DOP is omitted, the same way as procedures described in Example 7 were carried out to thereby prepare three kinds of sheets of 0.7 mm. in thickness each. The results of the deterioration tests conducted on these sheets by means of gear oven method are as shown in Table 5. The figures in said table represent respectively the time from the start of the test until the sheet assumes a blackish-brown color. The text and figures in parentheses refer to tests in which 0.5 part by weight of Ca stearate was additionally employed in the composition.

TABLE 5

| Stabilizer employed | Condition of sheet after rolling | Gear oven test at 160° C. (minutes) |
|---|---|---|
| Copolymer | Tinged with orange color; slightly cloudy (light orange color; slightly cloudy). | 100(140) |
| Zinc stearate | Colorless; poor in transparency; un-gelled portion remains (light brown; slightly cloudy). | 5(20) |
| Cadmium stearate | Tinged with orange color; slightly cloudy (light orange color; slightly cloudy). | 130(160) |

Example 9

Two parts by weight of calcium methacrylate-laurate methacrylate copolymer was blended with a mixture of 100 parts by weight of vinyl chloride resin ($\overline{P}=1050$).

3.7 parts by weight of DOP, 1 part by weight of epoxidized soybean oil and 0.3 part by weight of zinc stearate, and a sheet is prepared in the same way as in Example 7. On the other hand, for the purpose of comparison, another sheet was prepared in the same way as the foregoing except that calcium stearate was employed in lieu of said copolymer. Both sheets were subjected to deterioration tests by means of the gear oven method. The results of said tests are shown in Table 6. The figures in said table represent respectively the time from the start of the test until the sheet assumes a blackish-brown color.

TABLE 6

| Stabilizer employed | Condition of sheet after rolling | Gear oven test at 170° C. (minutes) |
|---|---|---|
| Copolymer | Colorless; transparent | 60 (tinged with orange color). |
| Calcium stearate. | Slightly orange colored; opaque. | 30 (reddish orange color). |

NOTE.—The bracketed passages in the Table indicate the state of respective sheets 10 minutes after the start of gear oven test.

Example 10

Two parts by weight of zinc crotonate-vinylidene chloride copolymer was blended with a mixture consisting of 100 parts by weight of vinyl chloride resin ($\bar{P}=1300$), 10 parts by weight of a polymer blend consisting of acrylonitrile-butadiene and polyvinyl chloride (in this case, Nippon Geon Hiker—1203 was used), 50 parts by weight of DOP, 20 parts by weight of DBP, 15 parts by weight of methyl chloride stearate (in this case, L–20 manufactured by Asahi Denka K. K. was used) and 3 parts by weight of azo-dicarboxylamide. The thus blended mixture was subjected to 5 minutes' kneading by a two-roll machine heated up to 130° C., whereby there was prepared a sheet of 0.5 mm. thickness. Subsequently, said sheet and a starch-coated ground cloth were affixed together by applying a pressure of 50 kg./cm.² for 2 minutes with a press heated up to 120° C., thereby producing an artificial leather sheet. On the other hand, for the purpose of comparison, by employing zinc stearate and cadmium stearate respectively in lieu of the foregoing copolymer, two kinds of sheets are prepared. These two sheets are also processed for affixing with a ground cloth respectively in the same way as in the foregoing, producing two kinds of artificial leather sheets. The three kinds of artificial leather sheets thus prepared were subjected to a foamability test by the gear oven method. The results of said tests are shown in Table 7.

As seen in Table 7, the effect of the method employing a metal-containing copolymer according to the present invention is as good as that of the conventional method employing cadmium stearate, and is not accompanied by such a defect as poor, foam-stabilization property as is the case with zinc stearate.

Example 11

Two parts by weight of a ternary copolymer obtained in Example 5 (LVE-Zn-Ca #3535) was blended with a mixture consisting of 100 parts by weight of vinyl acetate copolymer resin (containing 3 percent of vinyl acetate), 40 parts by weight of DOP, 3 parts by weight of epoxide soybean oil and 0.5 part by weight of stearic acid. The thus blended mixture was subjected to 5 minutes' kneading by a two-roll machine heated up to 160° C., whereby there was prepared a sheet of 0.7 mm. in thickness. On the other hand, for the purpose of comparison, by employing 2 parts by weight of a paste-form stabilizer consisting of four parts by weight of zinc stearate, three parts by weight of calcium stearate and 3 parts by weight of epoxide soybean in lieu of the foregoing ternary copolymer, another sheet was prepared. The results of gear oven tests conducted on these two sheets are as shown in the following Table 8. The figures in said table represent respectively the time from the start of the test until the sheet assumed a blackish brown color.

TABLE 8

| Stabilizer employed | Condition of sheet after rolling | Gear oven test at 170° C. (minutes) |
|---|---|---|
| Ternary copolymer | Very slightly colored; transparent. | 80 (slightly colored). |
| Paste-form stabilizer | Very slightly colored; slightly cloudy. | 60 (light reddish orange color). |

NOTE.—The bracketed passages in the table indicate the state of respective sheets 20 minutes after the start of gear oven test.

Example 12

The following are examples of practical compositions wherein the stabilizer copolymer according to the present invention demonstrates its excellent efficiency.

| Examples of compositions: | Parts by weight |
|---|---|
| (A) PVC (straight resin) | 100 |
| DOP | 35 |
| DOA | 5 |
| Organic tin compound | 1 |
| Zn acrylate-acryonitrile copolymer | 1 |
| Cd-Ba stearate | 1 |
| Chelating agent | 1 |
| Ultra-violet ray absorbent | 0.5 |
| Colorant | Some quantity |
| (B) PVC (straight resin) | 100 |
| DOP | 35 |
| Epoxy plasticizer | 5 |
| Cd stabilizer | 0.5 |
| Zn acrylate-lauryl vinyl ether copolymer | 1 |
| Ba stabilizer | 1 |
| Chelater | 0.5 |
| Colorant | Some quantity |
| (C) PVC (vinyl acetate copolymer) | 100 |
| Plasticizer | 40 |
| Calcium carbonate | 350 |
| Asbestos | 150 |
| Rosin acid salt | 10 |
| Titanium oxide | 15 |
| Zn acrylate-Ca acrylate-lauryl vinyl ether copolymer | 3 |
| Lead stearate | 0.5 |

With reference to the term "equivalent" as used above in referring to the weight of the salts of unsaturated carboxylic acid in the entire monomer composition, Zn, Pb, Cd, Ca, Mg, Ba and Al combine with acrylic acid, meth-

TABLE 7

| | | Gear oven test at 190° C. | | |
|---|---|---|---|---|
| Stabilizer employed | Post-pressing condition of sheet | 2 minutes after the start | 4 minutes after the start | 5 minutes after the start |
| Copolymer | Not foamed | 2 times the original thickness due to foaming; white. | 2.5 times the original thickness due to foaming; uniform in cell structure; white. | Excessive foaming is partially observed tinged with brown color. |
| Zinc stearate | Slight foaming is observed. | 2.5 times the original thickness due to foaming; slightly excessive foaming is observed; white. | Foam size is enlarged due to excessive foaming; slightly brown. | Foam size is further enlarged; yellowish brown. |
| Cadmium stearage. | Not foamed | 2 times the original thickness due to foaming; whiter than the above two sheets. | Unevenness of the surface due to excessive foaming is observed; white. | Foam size is enlarged and partial collapse is observed; slightly brown. | acrylic acid or crotonic acid to form salts of the acid, two representative examples of which are indicated at (1) and (2) in the following table. The molecular structure of a representative vinyl monomer is indicated at (3) in the following table.

TABLE 9

| Molecular structure | Molecular weight (grams) | One equivalent (grams) |
|---|---|---|
| (1) 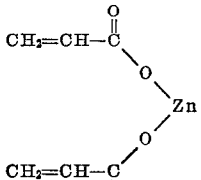 (Zinc acrylate). | 207.3 | 103.65 |
| (2) 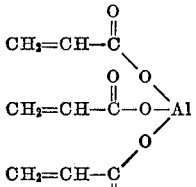 (Aluminum acrylate). | 240 | 80 |
| (3) $CH_2=\overset{CH_3}{\underset{|}{C}}-COOCH_3$ (Methylmethacrylate). | 100 | 100 |

Thus, the term "equivalent" as used herein is defined as follows:

one equivalent $=\dfrac{\text{molecular weight of monomer}}{\text{number of polymerizable double bonds}}$ Thus, one equivalent of the polymerizable vinyl monomer is equal to the molecular weight thereof. One equivalent of the metal salt of the carboxylic acid depends on the valence of the metal used. Thus, the term "percent by equivalent" as used herein with reference to the ratio of metal salt monomers to the total weight of monomers means the ratio of the number of equivalents of metal salt monomers divided by the sum of the number of equivalents of salt monomers added to the number of equivalents of polymerizable vinyl monomer.

In some instances the metal salts of acrylic acid, methacrylic acid and crotonic acid are crystals having a low solubility in water, in which case water is supplied to polymerization system separate from the crystals. However, the reaction of acrylic acid, methacrylic acid and crotonic acid with the metal is generally carried out in an aqueous solution, in which case the reaction product (the metal salt of the carboxylic acid) is obtained in the state of an aqueous solution. The reaction product obtained in this state can be added to the polymerization system, as is, whereby both the metal salt of the carboxylic acid and the water are supplied to the polymerization system together. Example 3 is an example of such a procedure.

The "gear oven method" referred to above is similar to the method for testing the thermal stability of plastics by the use of a circulation air oven according to ASTM D794–49. According to the gear oven method, the plastic composition being tested is kneaded at 160° C. for 10 minutes (in some cases at 170° C. or 180° C. for 10 minutes) by a heated roller and is obtained in the form of a sheet. The sheet is cut into test pieces (2 cm. in length x 1.5 cm. in width x about 0.1 cm. in thickness). The test pieces are placed inside a circulation air oven (gear oven), which is maintained at 170±2° C. (in some cases at 180° C. or 150° C.). The test pieces are removed after given periods of time (usually 20 minutes, but in some cases 30 minutes) and observations are made as to the deterioration thereof (color and mechanical strength).

The embodiments of the invention in which an exclusive property or privilege is claimed are defined as follows:

1. A method for preparing a copolymer of salts of unsaturated acids with vinyl monomers, which comprises:
   dissovling in a reaction solvent containing from about 5 to 50% by weight of water, the balance being at least one water-soluble organic solvent selected from the group consisting of methyl alcohol, ethyl alcohol, propyl alcohol, isopropyl alcohol, isobutyl alcohol and mixtures thereof:
   (1) a first monomer component consisting of at least one metal salt selected from the group consisting of zinc, lead, cadmium, calcium, magnesium, barium and aluminum salts of an acid selected from the group consisting of acrylic acid, methacrylic acid and crotonic acid; and
   (2) a second monomer component consisting of at least one polymerizable vinyl monomer selected from the group consisting of alkyl acrylate esters whose alkyl radical has 1 to 18 carbon atoms, alkyl methacrylate esters whose alkyl radical has 1 to 18 carbon atoms, styrene, acrylonitrile, alkyl vinyl ethers whose alkyl radical has 1 to 18 carbon atoms, vinyl chloride and vinylidene chloride, the ratio of said first component in the reaction system being between about 8.0 percent by equivalent and about 75 percent by equivalent, based on the total weight of the monomers in the reaction system:
   subjecting the resulting mixture to copolymerization in the presence of a polymerization initiator; and then filtering the resultant copolymer to obtain said copolymer in the form of fine granular particles.

2. A method according to claim 1, in which said metal salt is zinc acrylate and said vinyl monomer is alkyl vinyl ether whose alkyl group has 1 to 18 carbon atoms.

3. A method according to claim 1, in which said polymerization initiator is a radical polymerization initiator selected from the group consisting of benzoyl peroxide, azobisisobutyronitrile, potassium persulfate and sodium hydrogen sulfite.

4. A method according to claim 1, in which the copolymerization reaction is carried out in an open type receptacle equipped with a reflux condenser.

5. A method according to claim 1, in which the copolymerization reaction is carried out in an iron autoclave provided with glass lining.

References Cited
UNITED STATES PATENTS

| | | | |
|---|---|---|---|
| 2,160,054 | 5/1939 | Bauer | 260—84 |
| 2,757,106 | 7/1956 | Brown | 117—155 |
| 2,956,046 | 10/1960 | Glavis | 260—80.5 |
| 3,313,761 | 4/1967 | Barnes | 260—31.8 |
| 3,356,658 | 12/1967 | Andersen | 260—79.5 |
| 3,553,160 | 1/1971 | Schröeder | 260—45.75 |

JAMES A. SEIDLECK, Primary Examiner

S. M. LEVIN, Assistant Examiner

U.S. Cl. X.R.

260—23 XA, 31.8 M, 45.7 R, 45.75 R, 45.75 N, 45.85, 80.71, 80.76, 80.77, 80.8, 85.5 R, 86.1 R, 87.5, 87.7, 88.1 R, 887, 890, 891, 892, 899